(12) United States Patent
Balasaygun

(10) Patent No.: US 9,729,392 B2
(45) Date of Patent: Aug. 8, 2017

(54) INTELLIGENT MESSAGE MANAGER

(75) Inventor: Mehmet C. Balasaygun, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1229 days.

(21) Appl. No.: 12/835,016

(22) Filed: Jul. 13, 2010

(65) Prior Publication Data
US 2011/0047228 A1    Feb. 24, 2011

Related U.S. Application Data

(60) Provisional application No. 61/235,838, filed on Aug. 21, 2009.

(51) Int. Cl.
| | |
|---|---|
| G06F 15/16 | (2006.01) |
| H04L 12/24 | (2006.01) |
| G06F 9/54 | (2006.01) |
| H04L 29/06 | (2006.01) |
| H04L 29/08 | (2006.01) |
| H04M 7/00 | (2006.01) |
| H04L 12/751 | (2013.01) |
| H04L 12/713 | (2013.01) |
| H04W 4/02 | (2009.01) |
| H04W 64/00 | (2009.01) |

(52) U.S. Cl.
CPC .......... *H04L 41/0803* (2013.01); *G06F 9/543* (2013.01); *H04L 45/02* (2013.01); *H04L 45/586* (2013.01); *H04L 65/403* (2013.01); *H04L 67/04* (2013.01); *H04L 67/24* (2013.01); *H04L 67/306* (2013.01); *H04M 7/0057* (2013.01); *H04W 4/02* (2013.01); *H04W 64/00* (2013.01)

(58) Field of Classification Search
CPC . H04L 12/587; H04L 12/5885; H04L 63/068; H04L 67/325; H04L 12/581; H04L 67/24
USPC ........................................ 709/205, 206, 207
See application file for complete search history.

(56) References Cited

U.S. PATENT DOCUMENTS

| | | | | |
|---|---|---|---|---|
| 6,094,694 | A * | 7/2000 | Hickson et al. | ................ 710/54 |
| 7,079,497 | B2 * | 7/2006 | Miura et al. | .................. 370/282 |
| 7,343,317 | B2 * | 3/2008 | Jokinen et al. | ............ 705/14.64 |
| 7,814,158 | B2 * | 10/2010 | Malik | ........................... 709/206 |
| 8,014,763 | B2 * | 9/2011 | Hymes | ....................... 455/414.2 |
| 2010/0287249 | A1 * | 11/2010 | Yigang et al. | ................ 709/206 |
| 2011/0039587 | A1 * | 2/2011 | Madhavan et al. | ........... 455/466 |

* cited by examiner

*Primary Examiner* — Liangche A Wang
(74) *Attorney, Agent, or Firm* — Sheridan Ross P.C.

(57) ABSTRACT

A message manager is capable of analyzing a number of inputs to dynamically adjust rules used to delete messages as well as determine what kinds of messages are likely candidates to be deleted due to their being stale. If a message is determined to be a likely candidate for deletion, the message manager may query the user if they want to delete all messages with similar characteristics, e.g., sender, title, dates sent, time sent, recipients, content, context, and the like. If the user selects "yes" then the message manager may automatically update its deletion rules and further delete all messages in accordance with the user's selection.

21 Claims, 2 Drawing Sheets

INTELLIGENT MESSAGE MANAGER

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

An exemplary aspect is directed toward enhanced communications. More specifically, an exemplary aspect is directed toward determining when a message, for example, in an email box, voicemail, or in general any location, is stale and performing one or more specific actions upon the determination being made that the message is stale.

BACKGROUND

It can be very annoying to most communication device users when they are away from particular communication devices or applications for an extended period of time only to return to a plurality of messages that are "stale." For example, consider a user that goes on vacation for a week and during their vacation there was a water break or some other event that occurred at their office during their absence. This event may have resulted in the transmission of one or more messages to all users at the office. The messages may have been transmitted in one or more modalities, such as voice messages, email messages, text messages, etc., in an attempt to alert the persons affected by the situation and further apprise the users of remedial measures taken to address the event. While these measures are useful at the time they are transmitted, they quickly become stale. When the vacationing user returns to the office, they must wade through the deluge of stale event messages.

SUMMARY

What is needed is an intelligent solution that assists the user upon returning from an absence, and in some cases automatically managing messages in one or more inboxes across multiple applications and communications modalities during their absence.

In accordance with one exemplary embodiment, a message manager, that is capable of being embodied as executable code stored in one or more memory locations that can be executed by one or more processors and associated devices, such as PC's, mobile communications devices, or the like, is capable of analyzing a number of inputs to dynamically adjust rules used to delete stale messages as well as determine what kinds of messages are likely candidates to be deleted. If a message is determined to be a likely candidate for deletion, the message manager may query the user if they want to delete all messages with similar characteristics, e.g., sender, title, date sent, time sent, recipients, content, context, and the like. If the user selects "yes" then the message manager may automatically update its deletion rules and further delete all messages in accordance with the user's preference.

Another exemplary aspect is directed toward providing a message manager that analyzes a user's calendar and scheduled meetings as one input in determining whether to automatically delete a stale message, or mark a stale message, or set of stale messages, as deletion candidates. Thus, when the user is gone, the message manager is capable of determining if any messages received during the user's absence are stale or are likely to become stale. If such a determination is made, then the message manager may automatically delete such messages or mark the messages as candidates for deletion. The candidates for deletion may be collectively brought to the attention of the user upon his/her return, and these messages may be handled by the message manager collectively based on a single input received from the user. Yet another option, all messages determined as being potentially stale, could be moved to a "stale" folder or comparable location. As yet another option, messages that are identified as being potentially stale can have one or more characteristics or attributes therewith modified. For example, their color, font, or other display characteristic could be modified, optionally in combination with displaying an icon that represents that the message manager believes the message may be stale.

Another aspect is providing a message manager that is capable of managing multiple message inboxes across a plurality of media types. Furthermore, the message manager may be enabled to delete messages having similar characteristics from different inboxes. As an example, if the message manager either has a rule that particular message is to be deleted from an email inbox or the message manager has determined that a particular message (or message thread) has been deleted by a user, then the message manager may analyze other inboxes owned by that user to determine if similar messages are residing in those inbox(es), such as in voicemail, unread text messages, and the like. These messages may be treated differently from other messages in the inbox and in some cases may be automatically handled in the same way that the particular message was handled in the email inbox.

As another example, if a user elects to save a voicemail message, then an email message determined to be related, such that because the sender is the same as the caller, then the message manager may highlight that email message as important, or at least related to the same message. Alternatively, or in combination, the email message may be placed at the top of the email inbox regardless of the time that the message was received.

Another exemplary aspect is providing an intelligent message manager that is capable of monitoring user activity when interfacing with an input to determine if certain types of messages are deleted by the user without any review prior to deletion or to determine if any type of message(s) are mass deleted, such as if multiple messages are substantially simultaneously deleted or deleted within a predetermined amount of time, then those message may be considered mass deleted. Based on the actions observed by the message manager, additional management rules may be dynamically added to the system.

In accordance with another exemplary aspect, the systems and techniques are not limited to message deletion, they may be extended to any rule or action used for message management, such as message movement between files or folders, highlighting, reorganization within an inbox, changes to icons or markings, changing a display characteristic associated therewith, or the like.

Accordingly, an exemplary aspect is directed toward message management.

Another exemplary aspect is directed toward modality independent message management.

Even further aspects are directed toward modality independent stale message management in a communications environment.

Additional aspects are directed toward determining when a message is stale, and performing an action based thereon.

Even further aspects are directed toward determining when a message is stale and dynamically determining an action to take in response to the determination that the message is stale.

Even further aspects are directed toward analyzing a plurality of messages, optionally across multiple communications modalities, and deleting or otherwise performing an action on messages determined to be stale based on one or more rules in one or more rule sets.

Even further aspects are directed toward message management where an initial action is performed, on the belief that a message is stale, with the user being queried as to whether the determined action is accurate.

Even further aspects are directed toward determining that a message is stale, performing an action on that message and all other related messages based, for example, based on common subject matter, content, Re: line information, sender or recipient information, timing information, or in general any characteristic common to the plurality of messages.

Yet another exemplary aspect is directed toward an intelligent message management system learning based on one or more prior acts by the user on how to dynamically handle messages that are determined to be stale.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), communications endpoints, etc, the embodiments are not limited to use with any particular type of communication system or configuration of system elements. Those skilled in the art will recognize that the disclosed techniques may be used in any communication application in which it is desirable to provide enhanced contactability.

Figure 1:
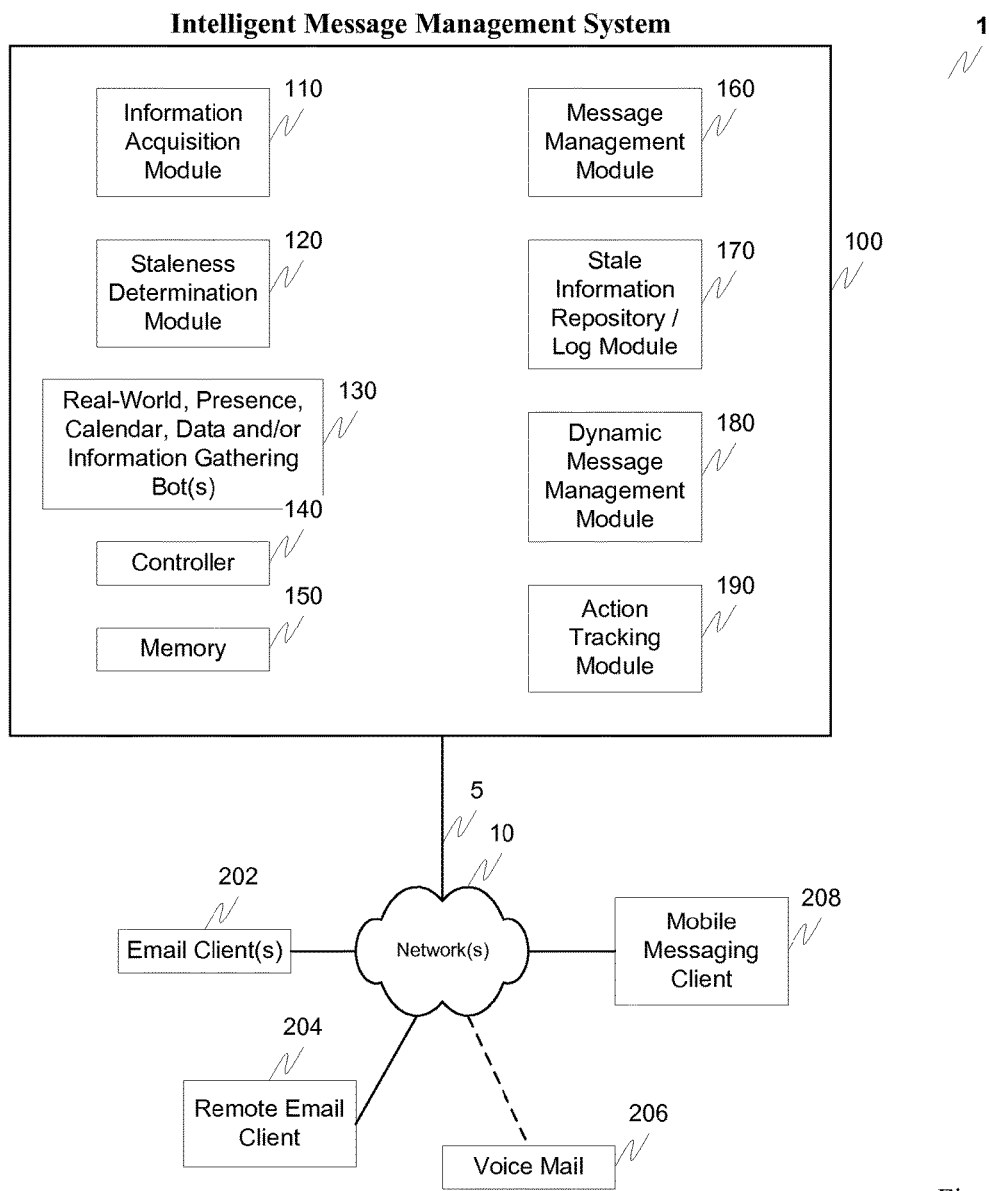
FIG. 1 illustrates an exemplary communications environment.

Referring initially to FIG. 1 an exemplary communication environment 1 will be described in accordance with at least some embodiments. The communication system comprises (in addition to well-known componentry) a communication network 10 connecting a plurality of communication devices, internet information sources and the like.

In one embodiment, the communication system may include a switch that may include a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call participants, servers and databases. The switching fabric can provide the functionality to direct incoming and/or outgoing calls to various endpoints and further provides for conferencing capabilities between endpoints as well as the ability for forward information associated with presence.

Communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality, such as an application (and associated communications hardware) that supports micro-blogging from a computer or mobile computing or communications device.

FIG. 1 illustrates an exemplary intelligent message management system 100 in a communications environment 1. The communications environment 1, in addition to well-known componentry, also includes one or more email clients 202, a remote email client 204, voicemail 206 and mobile messaging client 208, connected via one or more networks 10 and links 5 to the intelligent message management system 100. The intelligent message management system 100 further includes an information acquisition module 110, a staleness determination module 120, a real-world, presence, calendar, data and/or information gathering bot 130, controller 140, memory 150, message management module 160, stale information repository/log module 170, dynamic message management module 180 and action tracking module 190.

As discussed, an exemplary embodiment is directed toward stale message management. While messages can be from in any communications modality, some exemplary ones as illustrated in FIG. 1 include email messages, voicemail messages and messages on a mobile communications device, such as a text messages, SMS message, multimedia message, or the like. The intelligent message management system 100 is therefore communications modality agnostic and capable of cooperating with any messaging client to manage determined stale messages.

During normal day to day activities, a user typically receives a plurality of messages in one or more modalities. As discussed, these messages can typically include email messages, voicemail messages, and other messages from other sources. As the user has access to their various messaging clients, the user can typically monitor these various messages and delete them as appropriate. However, if the user is, for example, out of the office, or otherwise unable to manage messages via one or more of their messaging clients, messages may begin to accumulate in their message client, with some of these messages becoming stale upon the occurrence of one or more events.

Therefore, the information acquisition module 110, cooperating with the bot 130 and action tracking module 190 monitor one or more sources of information, including actions (such as those performed by a user), presence information, calendar information, and one or more real-world activities in an attempt to determine when a particular message(s) has gone stale.

Even more specifically, a message is received at the one or more clients, such as email client 202, remote email client 204, voicemail 206, mobile messaging client 208, or in general any messaging client. These messages are forwarded, or otherwise managed by the intelligent message management system 100 such that a determination can be made as to whether they are stale. Upon receipt of the message(s) by the intelligent message management system 100, the message is analyzed for one or more of context and content, including, but not limited to, information within the body of the email, time and date information, To: and From: information, Re: line information, caller ID information, or in general any information associated with the message. Once the messages associated with the various clients are being monitored, one or more additional conditions are monitored in an attempt to determine whether a message should be further managed based on their going stale. For example, various criteria can be looked at as an initial trigger to determine whether the intelligent message management system should begin managing stale message.

Information such as presence information, calendar information, real-world information, or in general any information can be gathered by bot 130. Similarly, the information acquisition module 110 can look at such things as how long it has been since the user has accessed a particular messaging client, and, as discussed in greater detail hereinafter, whether any specific action has been taken by the user as detectable by the action tracking module 190.

As a working example, assume the user has placed an out-of-office responder on their email client, and their calendar indicates they will be out of the office for five days. This information is digested by the bot 130 which can begin monitoring messages on behalf of the user when the user leaves the office for their vacation. As the messages begin arriving at the various clients, messages are evaluated by the staleness determination module 120 to determine whether the messages are stale. The staleness determination is based on information received from any one or more of the information acquisition module 110, bot 130, and action tracking module 190. An initial review of the message by staleness determination module 120 can determine whether the message is related to something that has occurred in the past. For example, if, with a comparison to one or more calendars, the message relates to a past meeting, it may be determined that the message is stale. In a similar manner, if a number of messages have arrived regarding a "lost file," and the final one of the messages indicating, based on a content analysis, that the file was "found!" then logic within the staleness determination module 120 can assume that all messages related to the lost file have become stale.

Once it is determined that a message is stale, the staleness determination module 120 cooperates with the message management module 160 to perform one or more actions on the stale message.

As the first option, the message can be deleted. As a second option, the determined stale message(s) can be moved to a special "stale message" folder. As another option, an icon or display characteristic associated with the message can be modified, such as the message being grayed out, a special stale-message icon associated with the message, or in general some characteristic of the message modified to indicate to the user that the message(s) was determined to be stale. As yet another example, one or more rules can be queried with the rules establishing guidelines on how determined stale messages should be handled. For example, a user can define a plurality of rules, with those rules being directed to one or more of content of the message, context of the message, type of action that occurred that caused the message to be stale, the handling of other similar messages, and user feedback, all of which provide guidance to the staleness determination module 120 as to how the message should be managed by the message manager module 160 and/or the dynamic message module 180. In accordance with one exemplary embodiment, upon the message management module 160 being notified that a certain message(s) is stale, the message(s) can be stored in the stale information repository 170. As discussed, this can be a special directory, folder, or in general any storage location that allows for the one or more determined stale messages to be stored in a location outside of the normal "inbox."

As another example, a user can be queried once a determination has been made by the staleness determination module that a message is stale confirming that the decision was correct. If the user indicates that the message is actually stale, the message can be handled in a manner as discussed above.

As yet another example, staleness determination module 120 can look at how similar messages were previously handled. For example, user conduct for managing messages within an email inbox can be taken into consideration by the information acquisition module 110 and forwarded to the staleness determination module 120. If the staleness determination module 120 determines that every message received by the user with the "lost file" Re: line is immediately deleted by the user, then there is a higher likelihood that the user would want the same handling of future received messages, especially if they are stale. Therefore, the staleness determination module 120, can cooperate with either of the message management module 160 and dynamic message management module 180 to overlay this knowledge of prior conduct to assist with the message management.

Once an initial determination has been made that a specific message(s) is stale, the staleness determination module 120 can cooperate with the message management modules 160 and 180 such that messages on disparate communications clients, regardless of modality, can be handled in a similar manner. For example, if the user received the "lost file" message on a mobile communications device, an email inbox and a second email client, the messages at these various clients can also be reconciled in a similar manner, optionally applying the same rules, or a different specific rule set for the particular client, in a similar manner as the original message that was received, and determined to be stale. This behavior can then be extended to dynamically handle messages in cooperation with the dynamic message management module 180. As an example, once a specific message, or series of messages, is determined to be stale, the handling of that message upon receipt by the intelligent message management system 100 can occur dynamically, for example, the one or more messages being handled by one or more rules that may take effect prior to the message even being received at the user's inbox. For example, if there were some follow-up messages regarding the "lost file," these messages, upon receipt, would be immediately determined to be stale, and the dynamic message management module 180 could directly move them to one or more of a stale message folder, could delete them, or in general perform any action on the message as previously discussed.

As an option embodiment, the handling of messages that are determined to be stale can be logged by the log module 170. Thus, even in situations where determined to be stale messages are deleted, this action can be logged by the log module 170 such that, in the instance a user needs to track handling and subsequent disposition of a message, that information would be available via the log module 170.

Operation of the staleness determination module can be based on one or more of rules, artificial intelligence, fuzzy logic, context and/or content analysis, and the analysis of any additional factor, such as presence information, calendar information, real-world input from any one or more information sources, as well as actions by a user to assist with determining whether particular information is stale. In addition, time and date information could also be considered as they have a direct impact as to whether a message has been received after an action has occurred that renders a message stale. For example, one a message is determined to be stale, that time and date can be stored and all subsequent messages received after that time and date also determined to be stale.

Regarding content and context, the staleness determination module 120 is also able to analyze one or more portions of a message, including an ability to perform speech-to-text content analysis of a voicemail, to determine what the message is about. For example, if the messages are about a fire alarm test that is supposed to occur on a certain date at a certain time, and that date has passed, it can be assumed that the message is stale.

Figure 2:
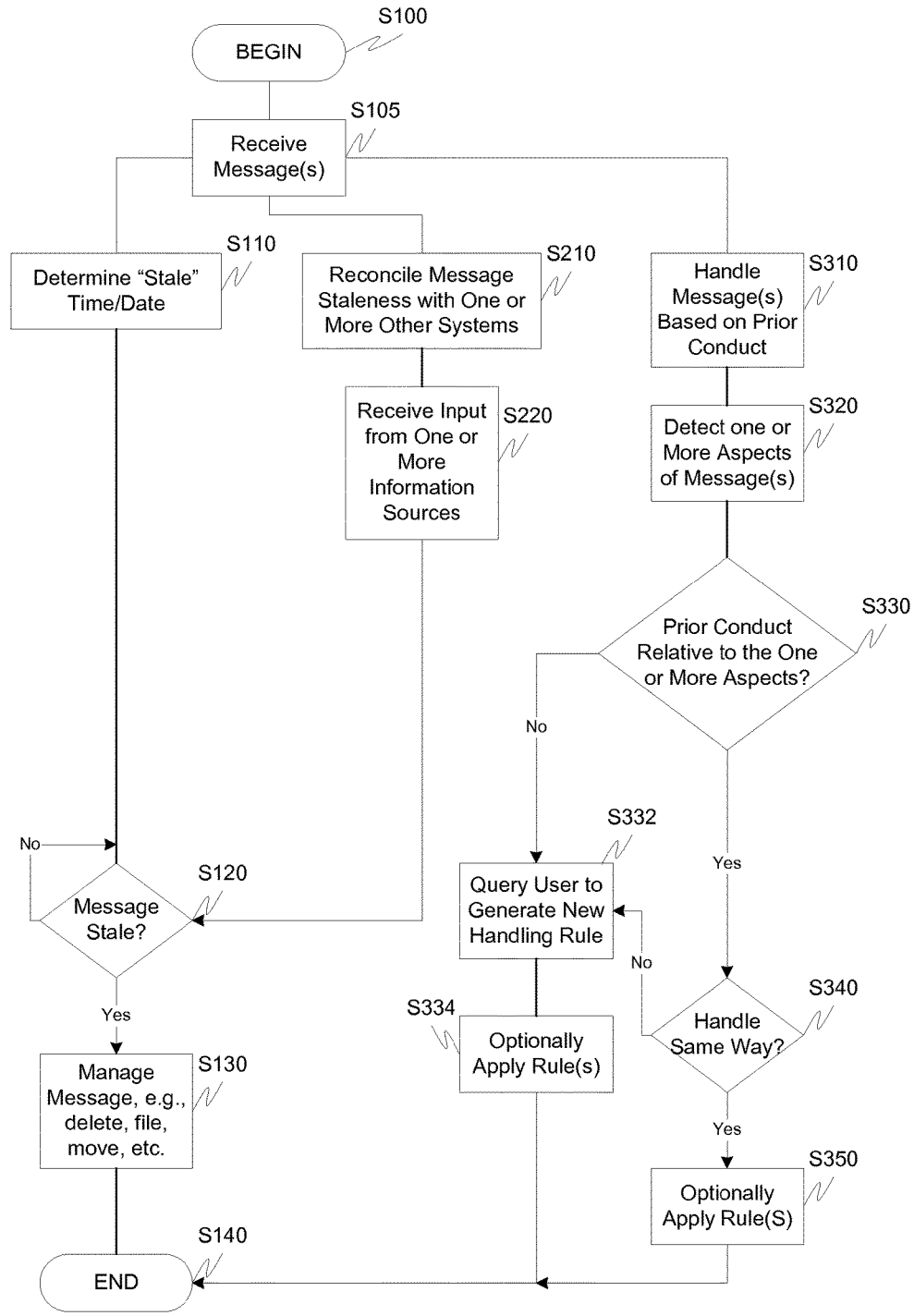
FIG. 2 is a flowchart outlining an exemplary method for managing messages.

FIG. 2 is a flowchart outlining exemplary method of operation of the intelligent message management system. In particular, control begins at step S100 and continues at step S105. In step S105, one or more messages are received. From receipt of the message, control can continue to one of three paths. A first path, in step S110, a determination is made as to what, if any, is the staleness time and date of the message. If, in step S120, it is determined that the message is stale, control continues to step S130 where the message is managed, which can include one or more of deleting it, moving it, filing it, changing a display characteristic associated with it, or the like, as previously discussed. If the message is not stale, the system can optionally continue to monitor the staleness of the message until, for example, the message is either determined to be stale, or another action occurs, such as the user logs into their message client and begins deleting, moving, identifying as stale or otherwise managing messages. Control then continues to step S140 where the control sequence ends.

In accordance with another control path, control continues to step S210 where message staleness is reconciled between one or more other messaging systems, in a modality agnostic manner. For example, if a message in an email client is determined to be stale, and that message is also present in one or more other messaging clients, such as a mobile communications device, the message on the mobile communications device can be handled in a similar manner as the message in the email client. Next, in step S220, additional information can optionally be received that assists with confirming the determined staleness of the message. This additional input can be used, for example, as a check-and-balance system to ensure that information from additional sources can also be considered by a staleness determiner to help ensure the correct decision is being made. Control then continues to step S120 where, as previously discussed, determination is made as to whether the message is stale.

In another operational path, control continues to step S310 where prior conduct of a user can be utilized as an input to assist with handling one or more messages. For example, information such as message threading, Re: line information, context and/or content can be first analyzed to determine whether the message has a similar characteristic to one or more previous messages. If, in step S320, there is a common characteristic, one exemplary embodiment assumes that the message is similarly enough related that it should be handled in the same manner. Then, in step S330, a determination is made whether, if any, prior action was taken relative to any of the determined similar messages. If there was prior conduct, control continues to step S340. Otherwise, control jumps to step S332.

In step S340, a determination can be made as to whether the message should be handled in the same way. If the message should be handled in the same way, control continues to step S350 where rules can optionally be applied in conjunction with the previous handling with control continuing to step S140 where the control sequence ends.

Otherwise, control can jump to step S332 where the user can optionally be queried as to whether they would like to generate a new handling rule for the message or message set. Control can then continue to step S334 where, similar to step S350, one or more rules can optionally be applied with control continuing to step S140 where the control sequence ends.

The various embodiments include components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhancing communications. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for modality independent enhancing of communications comprising:
    receiving one or more messages from one or more sources;
    evaluating factors comprising a calendar information associated with the one or more messages and further comprising at least one of user actions, presence information, and real-world activities, wherein the calendar information is distinct from each of the user actions, the presence information, and the real-world activities, wherein each of the user actions, the presence information, and the real-world activities include information in addition to dates and times, wherein the evaluation of the calendar information and at least one of the user actions, the presence information, and the real-world activities indicates that the one or more messages are stale; and
    managing the one or more stale messages in a predefined manner, wherein the predefined manner comprises actions in addition to deletion of the one or more stale messages.

2. The method of claim 1, further comprising determining a time and date for when a message is stale.

3. The method of claim 1, further comprising applying one or more rules in conjunction with the managing of the one or more stale messages.

4. The method of claim 1, further comprising receiving input from one or more information sources, the input used as the one or more factors.

5. The method of claim 1, wherein the managing includes one or more of moving, filing, deleting and modifying an attribute of the one or more stale messages.

6. The method of claim 1, wherein the one or more sources are one or more of an email client, a remote email client, voice mail and a mobile messaging client.

7. The method of claim 1, further comprising one or more of logging and storing the one or more stale messages.

8. The method of claim 1, further comprising evaluating one or more of real-world information, presence information, calendar information, data and information gathered by a bot.

9. The method of claim 1, wherein the managing includes one or more of moving, filing and modifying an attribute of the one or more stale messages associated with one or more messaging clients.

10. The method of claim 1, wherein the managing includes at least two of moving, filing, deleting and modifying an attribute of the one or more stale messages associated with one or more messaging clients on one or more communication devices.

11. The method of claim 1, wherein the factors comprise the calendar information associated with the one or more messages and at least two of user actions, presence information, and real-world activities, and wherein the real-world activities are distinct from the presence information.

12. A non-transitory computer-readable information storage media having stored thereon instructions, that if executed by a processor, cause to be performed the steps of claim 1.

13. A system for modality independent enhancing of communications comprising:
an intelligent message management system that receives one or more messages from one or more sources;
a staleness determination module that evaluates factors wherein the factors comprise a calendar information associated with the one or more messages and wherein the factors further comprise at least one of user actions, presence information, and real-world activities, wherein the calendar information is distinct from each of the user actions, the presence information, and the real-world activities, wherein each of the user actions, the presence information, and the real-world activities include information in addition to dates and times, wherein the evaluation of the calendar information and at least one of the user actions, the presence information, and the real-world activities indicates that the one or more messages are stale; and
a message management module that manages the one or more stale messages in a predefined manner, wherein the predefined manner comprises actions in addition to deletion of the one or more stale messages.

14. The system of claim 13, wherein a time and date for when a message is stale are determined.

15. The system of claim 13, wherein the message management module applies one or more rules in conjunction with the managing of the one or more stale messages.

16. The system of claim 13, further comprising an information acquisition module that receives input from one or more information sources, the input used as the one or more factors.

17. The system of claim 13, wherein the managing includes one or more of moving, filing, deleting and modifying an attribute of the one or more stale messages.

18. The system of claim 13, wherein the one or more sources are one or more of an email client, a remote email client, voice mail and a mobile messaging client.

19. The system of claim 13, further comprising an information repository and log module that one or more of logs and stores the one or more stale messages.

20. The system of claim 13, further comprising a bot that evaluates one or more of real-world information, presence information, calendar information, data and information gathered by a bot.

21. The system of claim 13, wherein the managing includes one or more of moving, filing, deleting and modifying an attribute of the one or more stale messages associated with one or more messaging clients on one or more communication devices.

* * * * *